D. STEWART.
Coffee Pot.
No. 32,011.
Patented April 9, 1861.
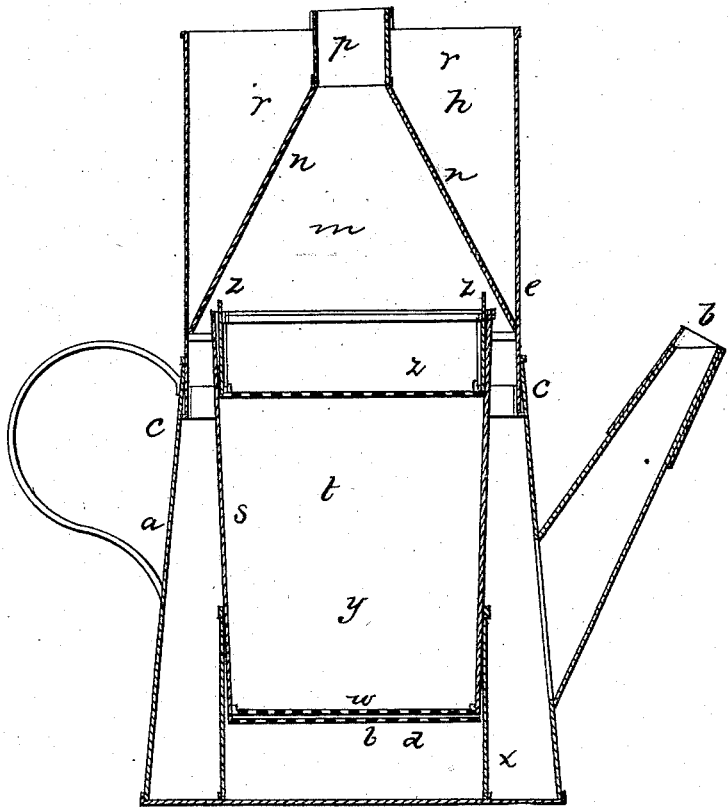
Witnesses
Wm Glover
John Glover
Inventor
D. Stewart

UNITED STATES PATENT OFFICE.

DAVID STEWART, OF ANNAPOLIS, MARYLAND.

COFFEE-POT.

Specification of Letters Patent No. 32,011, dated April 9, 1861.

*To all whom it may concern:*

Be it known that I, DAVID STEWART, of Annapolis, in the county of Anne Arundel and State of Maryland, have invented an Improvement in Coffee-Pots, and that the following is a full, clear, and exact description of the principle or character which distinguishes it from all other things before known and of the usual manner of making, modifying, and using the same, reference being had to the accompanying drawings, of which the figure is a vertical section through the middle of the coffee-pot.

My invention consists in an improvement in the coffee boiler and also in the coffee biggin or percolator by which the elements of the coffee that are volatilized and wasted in the common coffee pot are returned so as to displace the soluble parts of the coffee, being inclosed by an air tight joint between the boiler and condenser, and by which the coffee is not only more thoroughly exhausted of all its valuable elements but separated from the decoction or fluid perfectly so that no egg or other means of the kind is required in order to clear the coffee.

The coffee pot $a$, is of the usual form, the spout being provided with a closely fitting cup $b$ to confine the vapor. Just below and within the upper part of the coffee pot is a circular groove or gallery $c$ into which enters the lower edge of the condensing vessel $e$ and when the gallery contains water an air tight joint is formed preventing the escape at this point of the vapors and aroma from the coffee. The condensing vessel is formed of the cylinder $h$, a conical condensing chamber $m$, the cone $n$ having an open pipe $p$ or funnel at the top. The space $r$ between the cone and the cylinder is for cold water for keeping up the condensation.

The biggin $s$ is formed as follows: $t$ is a tin vessel slightly tapering downward with a perforated bottom $w$, for a strainer and made as usual of finely perforated metal plate. Over the under side of this strainer is stretched a second stainer $v$ made of a disk of flannel, the lower edge of the biggin projecting downward a little below the strainer so as to leave a space $d$ between the two strainers. The strainer $v$ is held in place by being pressed around the biggin by means of a tin collar $x$ and this collar is so fitted as to project considerably below the strainers and elevate them above the bottom of the coffee pot. There is also a flannel strainer $z$ below the upper edge of the biggin and this is made of a disk of flannel stretched over a tin collar which is inserted tight within the upper part of the biggin. The edges of this flannel disk project upward so as to come into contact or nearly so with the condensing surface of cone $n$, so as to receive and conduct the water of condensation back again upon the coffee within the biggin.

The coffee is placed in the space $y$ and as the vapor or steam rises it condenses on the inner surface of cone $n$, before it can pass out of the funnel $p$, while the open funnel prevents the rise of temperature above the boiling point. The elevation of the lower part of the biggin keeps the coffee always above the bottom of the pot and therefore not liable to be burned and the perfect confinement of the ground coffee by the upper and lower strainers prevents any of the fine particles from mingling with the decoction in the body of the coffee pot $a'$ so that the coffee is always clear and requires no artificial means of settling. The cap upon the spout and the water joint at $c$ prevent the escape of steam which always carries with it the finest aroma of the coffee.

First I claim for my improvements the advantages of the cheapest air tight joint to the coffee boiler—viz. the water joint by which all the fine aroma of the coffee is perfectly confined below the condenser and can only escape by traversing the cold atmosphere or surface of the condenser, thus preventing the formation of empyreumatic or oxidized volatile compounds that are exceedingly offensive to the stomach and render coffee (as usually made) unwholesome to some persons.

Second I claim the advantages of a form of condenser through which all the steam and volatile matter must pass during the ebullition of the "coffee" and from which it is constantly returned by condensation into the biggin so that by cohobation as well as percolation the coffee is exhausted of all its soluble elements.

Third, I claim the advantages of a peculiar form of biggin or percolator and strainer that remedies all the inconvenience attending all other arrangements of the kind. First, it insures clear coffee; second, it dispenses with eggs &c. and all of the stirring and waste of time in adding the water to the coffee in the biggin, it being impossible for the coffee to float over the top of the biggin either while the water is being added or during the subsequent, ebullition or during the process of decantation; third, it suspends the coffee above the heated surface so that it is impossible it should burn but must always be immersed in the least saturated and hottest part of the water viz. the upper part; fourth, the flannel that dips down into the cylinder or biggin above not only retains the coffee in the best possible position but also conducts the condensed steam from the condenser and spreads it over the magma so as to keep up a series of cohobations, the flaps or extremities of the flannel extending over the top of the cylinder catching the drops as they descend from the condenser.

I do not claim a coffee biggin or strainer provided with an upper and lower strainer, nor do I claim returning the water of condensation to the decoction of the coffee, but I do claim—

Combining such a biggin with a chamber of decoction and a chamber of condensation in which the water of condensation is returned to the magma in the manner herein set forth.

DAVID STEWART.

Witnesses:
 JOHN GLOVER,
 WM. GLOVER.